US010294699B2

(12) United States Patent
Kowalewski et al.

(10) Patent No.: US 10,294,699 B2
(45) Date of Patent: May 21, 2019

(54) ELECTRIC DOOR RELEASE SYSTEM

(71) Applicant: Faraday & Future Inc., Gardena, CA (US)

(72) Inventors: Daniel Kowalewski, Redondo Beach, CA (US); Matthew Richard Partsch, San Pedro, CA (US); Pei Chen, Torrance, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 86 days.

(21) Appl. No.: 15/279,607

(22) Filed: Sep. 29, 2016

(65) Prior Publication Data

US 2017/0089104 A1 Mar. 30, 2017

Related U.S. Application Data

(60) Provisional application No. 62/234,277, filed on Sep. 29, 2015.

(51) Int. Cl.

| | |
|---|---|
| ***E05B 81/82*** | (2014.01) |
| ***B60R 25/40*** | (2013.01) |
| ***G07C 9/00*** | (2006.01) |
| ***E05B 81/80*** | (2014.01) |
| ***B60R 25/00*** | (2013.01) |

(52) U.S. Cl.

CPC ............ *E05B 81/80* (2013.01); *B60R 25/403* (2013.01); *E05B 81/82* (2013.01); *G07C 9/00563* (2013.01); *B60R 2325/205* (2013.01)

(58) Field of Classification Search

CPC .......... E05B 81/56; E05B 81/82; E05B 47/00; E05B 47/02; E05B 49/00; E05B 65/00; E05B 65/02; B60R 25/403; G07C 9/00; G07C 9/00309; G07C 9/00182; E60R 25/40; E60R 25/34

USPC ............ 307/10.2, 10.1, 9.1, 109, 66, 64, 43; 320/112

See application file for complete search history.

(56) References Cited

U.S. PATENT DOCUMENTS

2004/0044914 A1* 3/2004 Gedeon ................ G06F 1/3203 713/300

2008/0000711 A1* 1/2008 Spurr ..................... E05B 81/76 180/289

2012/0280783 A1* 11/2012 Gerhardt ........... G07C 9/00309 340/5.6

(Continued)

FOREIGN PATENT DOCUMENTS

CN 104395153 3/2015

*Primary Examiner* — Fritz M Fleming

*Assistant Examiner* — Jagdeep S Dhillon

(74) *Attorney, Agent, or Firm* — Veros Legal Solutions, LLP

(57) ABSTRACT

An electric door release system and an electric door release method are disclosed. The system and method may be used for releasing a vehicle door when a primary power source of the vehicle is drained. According to certain embodiments, the system includes a power interface configured to receive a direct-current (DC) power from an external mobile device. The system also includes one or more door latches. The system further includes an isolation circuitry configured to prevent the DC power from powering circuitry not included in the electric door release system. The system further includes a controller configured to activate a door latch using the DC power.

17 Claims, 3 Drawing Sheets

(56) References Cited

U.S. PATENT DOCUMENTS

| | | | | |
|---|---|---|---|---|
| 2015/0102609 | A1* | 4/2015 | Johnson | E05B 1/0007<br>292/144 |
| 2016/0189456 | A1* | 6/2016 | Cumbo | G07C 9/00174<br>70/263 |
| 2017/0002586 | A1* | 1/2017 | Lee | E05B 47/0012 |
| 2017/0167166 | A1* | 6/2017 | Perreau | G08B 13/1427 |
| 2017/0181559 | A1* | 6/2017 | Lee | G07F 7/069 |
| 2017/0186256 | A1* | 6/2017 | Dumas | G07C 9/00182 |
| 2017/0243420 | A1* | 8/2017 | Lien | G07C 9/00309 |
| 2018/0056936 | A1* | 3/2018 | Parasurama | B60R 25/245 |

* cited by examiner

ELECTRIC DOOR RELEASE SYSTEM

CROSS REFERENCE TO RELATED APPLICATIONS

This application claims the benefit of priority from U.S. Provisional Patent Application No. 62/234,277 filed on Sep. 29, 2015, the entire disclosure of which is incorporated by reference.

TECHNICAL FIELD

The present disclosure relates generally to an electric door release system, and more particularly, to an electric door release system for unlocking vehicle doors when primary power sources are drained.

BACKGROUND

Power door lock has become a common option in modern vehicles. For example, an occupant of a vehicle can use a wireless key fob to send radio signals to an electric door latch. If the frequency matches a preset frequency, the electric door latch operates to unlock the corresponding door. Since the radio signals are used, the occupant can unlock the doors at a distance from the vehicle.

Some vehicles still provide mechanical locks in conjunction with the power door locks. Other vehicles, particularly the electric vehicles, are increasingly doing away the mechanical door locks. However, the electric door latch requires electric power to function properly. In the event that the vehicle runs out of internally stored electric energy, the occupant must find ways to recharge the vehicle or mechanically break into the vehicle. For example, the occupant may jump start the vehicle. But this method requires at least an extra vehicle present at the scene. Alternatively, the occupant may mechanically gain access to the vehicle to unlock the door from inside. But this method not only requires great expertise and skills, but also carries the risk of damaging the vehicle. Moreover, the occupant may always connect the vehicle to an external power source to recharge the vehicle. But the occupant must either move the unpowered vehicle to a charging station/pole or find a portable external power source that is often heavy and not readily available.

It is worth noting that one additional disadvantage common to all the above-described methods is that they all take a long time to finally unlock the vehicle doors. Often, the occupant only wants to enter the vehicle to retrieve some belongings, e.g., to retrieve a wallet left in the vehicle before the vehicle is pulled to a charging station. More importantly, there are emergencies, such as when a child is locked in the vehicle, that require entry into the vehicle in no time. Therefore, an electric door release system is needed to quickly and conveniently unlock the doors when the primary power source is drained.

The disclosed system is directed to overcoming one or more of the problems set forth above and/or other problems of the prior art.

SUMMARY

In one aspect, the present disclosure is directed to an electric door release system for releasing a vehicle door when a primary power source of the vehicle is drained. The system includes a power interface configured to receive a direct-current (DC) power from an external mobile device. The system also includes one or more door latches. The system further includes an isolation circuitry configured to prevent the DC power from powering circuitry not included in the electric door release system. The system further includes a controller configured to activate a door latch using the DC power.

In another aspect, the present disclosure is directed to an electric door release method for releasing a vehicle door when a primary power source of the vehicle is drained. The method includes receiving, by a power interface, a DC power from an external mobile device. The method also includes receiving a selection of a door to be released. The method further includes directing the DC power to a door latch associated with the selected door. The DC power is directed away, by an isolation circuitry, from powering electric loads other than releasing a door. The method further includes activating the door latch using the DC power.

In yet another aspect, the present disclosure is directed to a vehicle. The vehicle includes one or more door latches. The vehicle also includes one or more primary power sources for powering the one or more door latches. The vehicle further includes a power interface configured to receive a DC power from an external mobile device. The vehicle further includes a controller configured to activate a door latch using the DC power after the one or more primary power sources are drained. The vehicle further includes an isolation circuitry configured to prevent the DC power from charging the one or more primary power sources.

DETAILED DESCRIPTION

For discussion purposes only, the principles of the present disclosure are described in connection with the exemplary vehicle depicted in FIG. 1. Those skilled in the art will recognize that the principles of the present disclosure may be applied to an electric door release system employed by any types of structures or machines.

Figure 1:
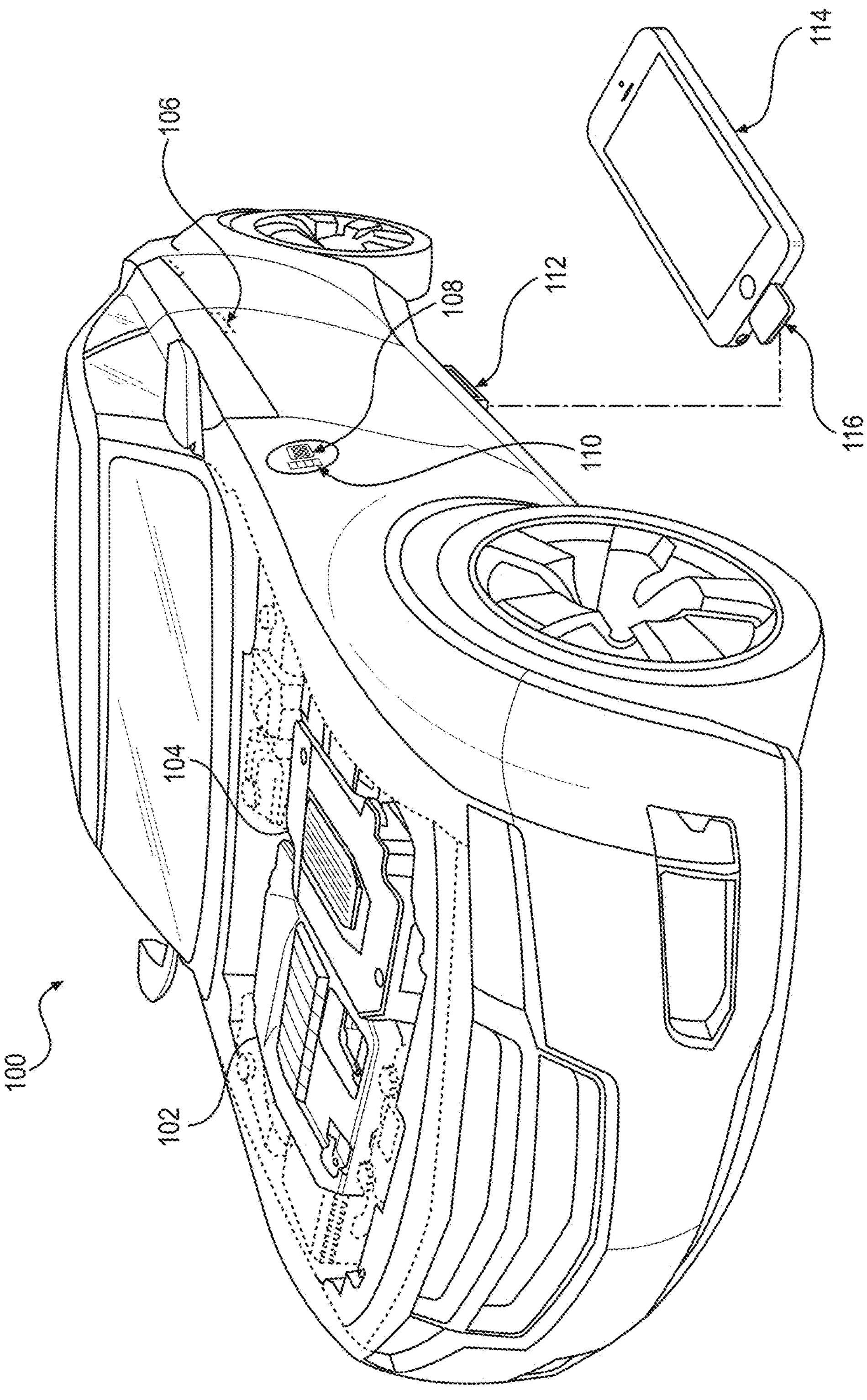
FIG. 1 is a schematic illustration of an exemplary vehicle including an electric door release system.

FIG. 1 is a schematic diagram illustrating a partial view of an exemplary vehicle 100. FIG. 1 will be described using an electric vehicle as an exemplary embodiment of vehicle 100, but vehicle 100 may be other types of vehicles. For example, vehicle 100 may be an electric vehicle, a fuel cell vehicle, a hybrid vehicle, or a conventional internal combustion engine vehicle. Vehicle 100 may have any body style, such as a sedan, a coupe, a sports car, a truck, a station wagon, an SUV, a minivan, or a conversion van. Referring to FIG. 1, vehicle 100 may carry multiple power sources, including a main battery pack 102 and a 12V battery 104. Although FIG. 1 shows main battery pack 102 and 12V battery 104 both located within the hood of vehicle 100, it is contemplated that they can be located in other compartments of vehicle 100, for example, in the chassis, or the back of the vehicle. Vehicle 100 may also include, among other things, at least one electric door latch 106 (hidden in the doors), a main charging port 108, and a 12V charging port 110.

Main battery pack 102 provides the majority electric power used by vehicle 100. Specifically, main battery pack 102 may output high-voltage direct current (DC), e.g., 400V, to the onboard power electronics of vehicle 100, which convert the DC voltage into alternating voltage supplied to electric motors and generators. 12V battery 104 may be used to supply 12V DC voltage for driving the 12V loads onboard, such as electric door latches 106, radios, lightings, heating, ventilation, and air conditioning (HVAC), etc. The high-voltage electric system may be generally separate from the 12V onboard system. A DC-DC converter may be connected between the high-voltage electric system and the 12V system to transform the high-voltage DC from main battery pack 102 into a corresponding 12V DC voltage for charging 12V battery 104.

An electric door latch 106 may be installed at each door of vehicle 100. Each electric door latch 106 may include an electric actuator to move a door latch. An occupant (e.g., driver or a passenger) of vehicle 100 may control electric door latch 106 by a wireless key fob with various buttons or a wireless proximity fob, which activates electric door latch 106 when it is within certain distance from vehicle 100. The wireless key fob or proximity fob may transmit a coded signal to a controller connected to a selected electric door latch 106. Once the coded signal is recognized, the selected electric door latch 106 may be activated to lock or unlock the corresponding door.

Main charging port 108 may connect external power sources to a bus associated with the high-voltage electric system to charge main battery pack 102. 12V charging port 110 may connect external power sources to the 12V onboard system to power electric door latch 106, when the primary power source, such as main battery pack 102 and 12V battery 104 are drained. Both main charging port 108 and 12V charging port 110 may include any appropriate electric receptacles to receive DC power from the external power sources, and devices to regulate the voltage and/or current of the received DC power. Both ports are on the exterior of vehicle 100 and may be covered by a cover (not shown). 12V charging port 110 may be located near main charge port 108, as shown in FIG. 1, or any other suitable places on vehicle 100, such as underneath the driver-side door (shown as door charging port 112 in FIG. 1) or under the exterior door panel and covered by a connector cover.

Electric door latch 106 is part of the 12V onboard system and is normally driven by 12V battery 104. In the event that both main battery pack 102 and 12V battery 104 are completely drained, an external mobile device 114 may be connected to 12V charging port 110 or 112 to power electric door latch 106. External mobile device 114 may be a handheld device, such as a cell phone, a smart phone, a laptop, a tablet, a personal digital assistant (PDA), a wearable device (e.g., a watch), a backup portable battery pack, etc. A charging connector 116 may be used to connect external mobile device 114 with 12V charging port 110. Charging connector 116 may be a retractable or foldable device, such as a cable or an adaptor. Charging connector 116 may be integrally built in external mobile device 114. Alternatively, charging connector 116 may be a detachable device that can be attached to external mobile device 114 through a USB port or a charging port on external mobile device 114.

Once external mobile device 114 powers electric door latch 106, the occupant may enter a door release request using a user interface. In one embodiment, the user interface may be a traditional wireless fob that allows the occupant to select one or more doors to unlock. In another embodiment, the user interface may be a control panel located near 12V charging port 110 or 112. The control panel may be configured to allow the occupant to select which door to unlock and to enter an authorization code to unlock the selected door. The control panel may include a touchscreen, a touch pad, or a keyboard to enable user input. The control panel may also include a fingerprint detector to authenticate the occupant's identity.

In some embodiments, the user interface may be implemented on external mobile device 114. For example, similar to a wireless fob, external mobile device 114 may include one or more buttons and a transmitter. Once the occupant selects a door using the one or more buttons, the transmitter may send a coded signal to unlock the selected door. As another example, external mobile device 114 may have computing power and be configured to run an application for locking or unlocking the vehicle doors. The application may be configured to allow the occupant to select a door and enter an authorization code to unlock the selected door. In these embodiments, external mobile device 114 may also be configured to perform other functions related to vehicle 100, such as starting vehicle 100, and thus can completely replace the traditional wireless fobs. For example, the vehicle manufacturer may provide external mobile device 114, e.g., a smart phone, as a gift while selling vehicle 100. This way, the occupant only needs the smart phone to open and/or start the vehicle, saving the trouble of carrying extra wireless fobs.

In exemplary embodiments, after receiving a door release request from the occupant, the user interface may generate a signal and transmit the signal to a controller (not shown) associated with the selected electric door latch 106. The controller may control the actuator of the selected electric door latch 106 to unlock the corresponding door.

Certain mechanisms may be employed to authenticate the door release input, so that unauthorized people cannot activate electric door latches 106. In some embodiments, the authentication mechanism may be implemented by the controller associated with electric door latches 106. For example, the controller may receive authorization codes or fingerprints inputted by the occupant, and match them with preset authorization codes or fingerprints. If the matching is successful, the controller may activate electric door latch 106 to unlock the selected door. If the matching is unsuccessful, the controller may refuse to activate electric door latches 106.

In some other embodiments, the authentication mechanism may be implemented on external mobile device 114. For example, external mobile device 114 may run an application to carry out the above described matching process. If the matching is successful, external mobile device 114 may send a control signal to the controller at a preset frequency. The controller may recognize the preset frequency and activate electric door latch 106. If the matching is unsuccessful, external mobile device 114 may refuse to send any control signal to the controller or trigger a security alert system on vehicle 100.

Figure 2:
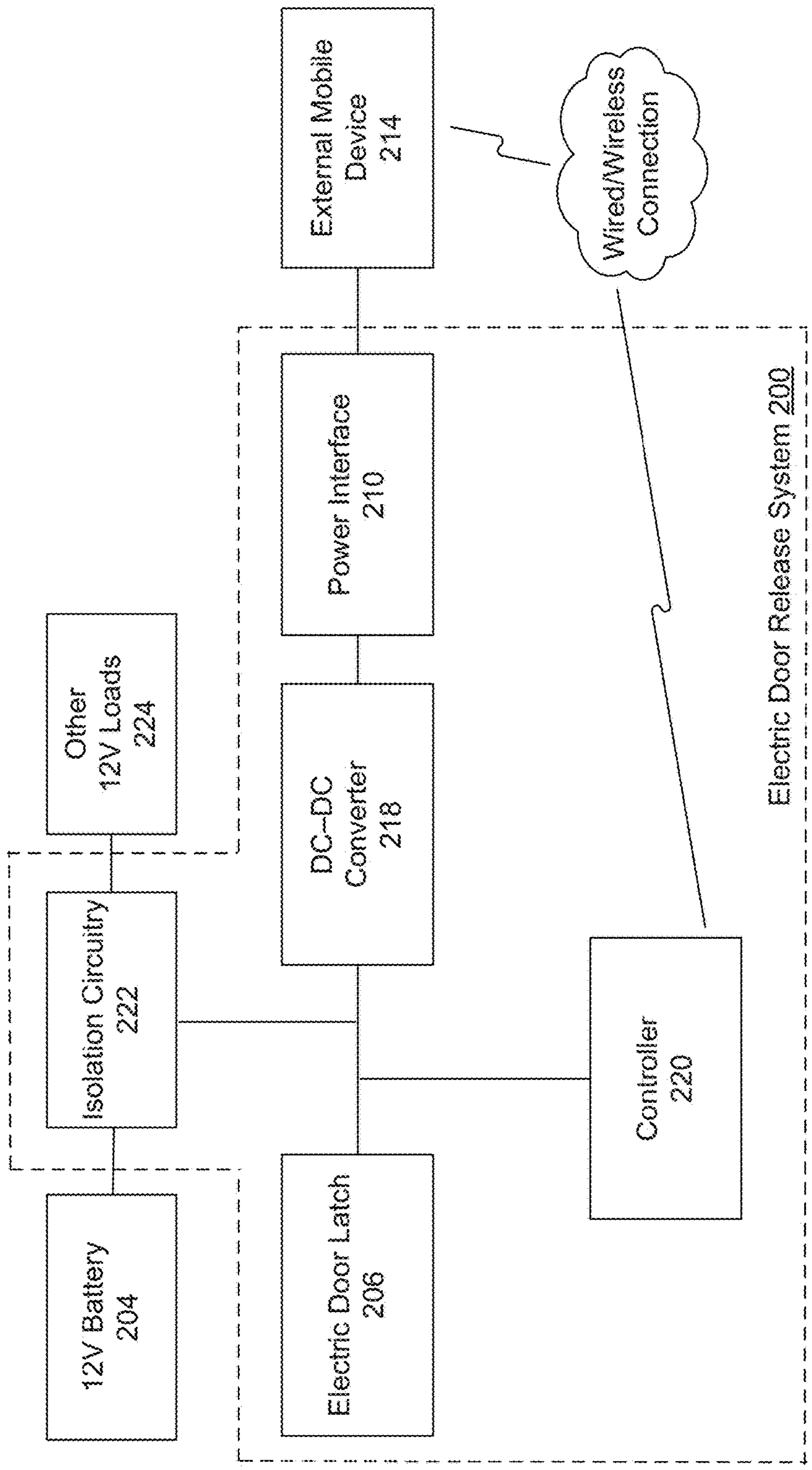
FIG. 2 is a block diagram of an exemplary electric door release system.

FIG. 2 is a block diagram of an electric door release system 200, according to an exemplary embodiment. For example, electric door release system 200 may be implemented in vehicle 100 (FIG. 1) to unlock doors. The electric door release system may include at least one door latch 206, a power interface 210, a DC-DC converter 218, a controller 220, and an isolation circuitry 222.

Power interface 210 may be configured to connect an external mobile device 214 to the 12V onboard system of vehicle 100, including electric door latch 206. For example, power interface 210 may be 12V charging port 110 or 112 (FIG. 1), accessible from outside of vehicle 100. In some embodiments, a charging connector, e.g., charging connector 116 (FIG. 1), may be used to couple power interface 210 with external mobile device 214.

The DC power drawn from the external mobile device 214 may be at a different voltage level from the DC voltage required by electric door latch 206. Thus, DC-DC converter 218 may be provided to convert the DC voltage from external mobile device 214 into the DC voltage level suitable to drive electric door latch 206, i.e., 12V. For example, the output voltage of a cell phone battery may be only 5 V. DC-DC converter 218 may convert 5 V to 12V. DC-DC converter 218 may be part of the 12V onboard electronics of vehicle 100. Alternatively, DC-DC converter 218 may be included in external mobile device 214 or the charging connector. DC-DC converter 218 may be implemented using known power devices such as transformers, magnetic converters, or switch-mode converters.

Controller 220 may be configured to activate electric door latch 206 using the DC power from external mobile device 214. Controller 220 may take many forms, including, for example, a computer based system, a microprocessor based system, a microcontroller, an electronic control module (ECM), an electronic control unit (ECU), or any other suitable control type circuit or system. Controller 220 may also include one or more of an application-specific integrated circuit (ASIC), a field-programmable gate array (FPGA), and a logic circuit, configured to allow controller 220 to function in accordance with the disclosed embodiments. Controller 220 may include one or more of the following components: a processing component, a memory, a storage device, an input/output (I/O) interface, and a communication component.

The processing component may be configured to receive signals from other electronics onboard or offboard vehicle 100 and process the signals to determine one or more conditions of the operations of electric door release system 200. The processing component may be further configured to generate and transmit a control signal via, for example, the I/O interface, to activate electric door latches 106. In operation, the processing component may execute computer instructions stored in the memory and/or storage device.

The memory and the storage device may include any proper type of storage medium. The memory may include a non-transitory computer-readable storage medium including instructions for applications or methods executable by the processing component. The memory may also store data used for authenticating external mobile device 214, such as preset authorization codes, the occupant's fingerprints, etc. For example, the non-transitory computer-readable storage medium may be a read-only memory (ROM), a random access memory (RAM), a flash memory, a memory chip (or integrated circuit), or the like. The storage device may include a volatile or non-volatile, magnetic, semiconductor, tape, optical, removable, nonremovable, or other type of storage device or computer-readable medium to further provide storage space for controller 220.

The I/O interface may include one or more digital and/or analog communication devices that allow controller 220 to communicate with other systems and devices. For example, the I/O interface may receive from external mobile device 214 a signal indicative of which door to unlock, and send the signal to the processing component for further processing. The I/O interface may also receive one or more control signals from the processing component, and send the control signals to electric door latch 206 to unlock the corresponding door.

The communication component may be configured to facilitate communication, wired or wirelessly, between controller 220 and other devices, including external mobile device 214. The communication component can access a wireless network based on one or more communication standards, such as WiFi, LTE, 2G, 3G, 4G, 5G, etc. In one exemplary embodiment, the communication component includes a near field communication (NFC) module to facilitate short-range communications between controller 220 and external mobile device 214. In other embodiments, the communication component may be implemented based on a radio frequency identification (RFID) technology, an infrared data association (IrDA) technology, an ultra-wideband (UWB) technology, a Bluetooth (BT) technology, or other technologies.

External mobile device 214 may be in wired or wireless communication with controller 220. External mobile device 214 may be a cell phone, a smart phone, a laptop, a tablet, a personal digital assistant (PDA), a wearable device (e.g., a watch), etc. Similar to controller 220, external mobile device 214 may also include one or more of a processing component, a memory, a storage device, an input/output (I/O) interface, and a communication component to carry out respective functions. Further, external mobile device 214 may include a user interface for the occupant to input a door release request. The user interface may include a button, a touchpad, a touchscreen, a keyboard, a camera, a scanner, an audio sensor, a force sensor, etc. Exemplary input may include a touch input, a key stroke, force, sound, speech, face recognition, fingerprint, handprint, etc. External mobile device 214 may run a door release application that allows the occupant to select the doors to be unlocked and enter an authorization code. External mobile device 214 may also generate a signal encoding the user input and transmit the signal to controller 220.

Controller 220 may receive the signal and authenticate external mobile device 214 based on the entered authorization code. If controller 220 determines that the entered code matches with a preset authorization code, controller 220 may generate a control signal to drive an electric door latch 206 to unlock the selected door. Otherwise, controller 220 may refuse to activate electric door latches 206 and/or activate a security alert system of vehicle 100.

Isolation circuitry 222 may be configured to isolate electric door release system 200, when powered by external mobile device 214, from the rest circuitry of the 12V power system, including, e.g., 12V battery 204 and other 12V loads 224. As a result, only electric door release system 200 is powered by external mobile device 214. For example, isolation circuitry 222 may include a diode to allow power flows from 12V battery 204 to electric door latch 206, but not in the opposite direction. Some external mobile devices 214, e.g., cell phones, may only store limited electric energy. Isolation circuitry 222 may serve to protect the cell phones' batteries from being drained or damaged by supplying too much power to the 12V battery and other 12V loads 224.

Figure 3:
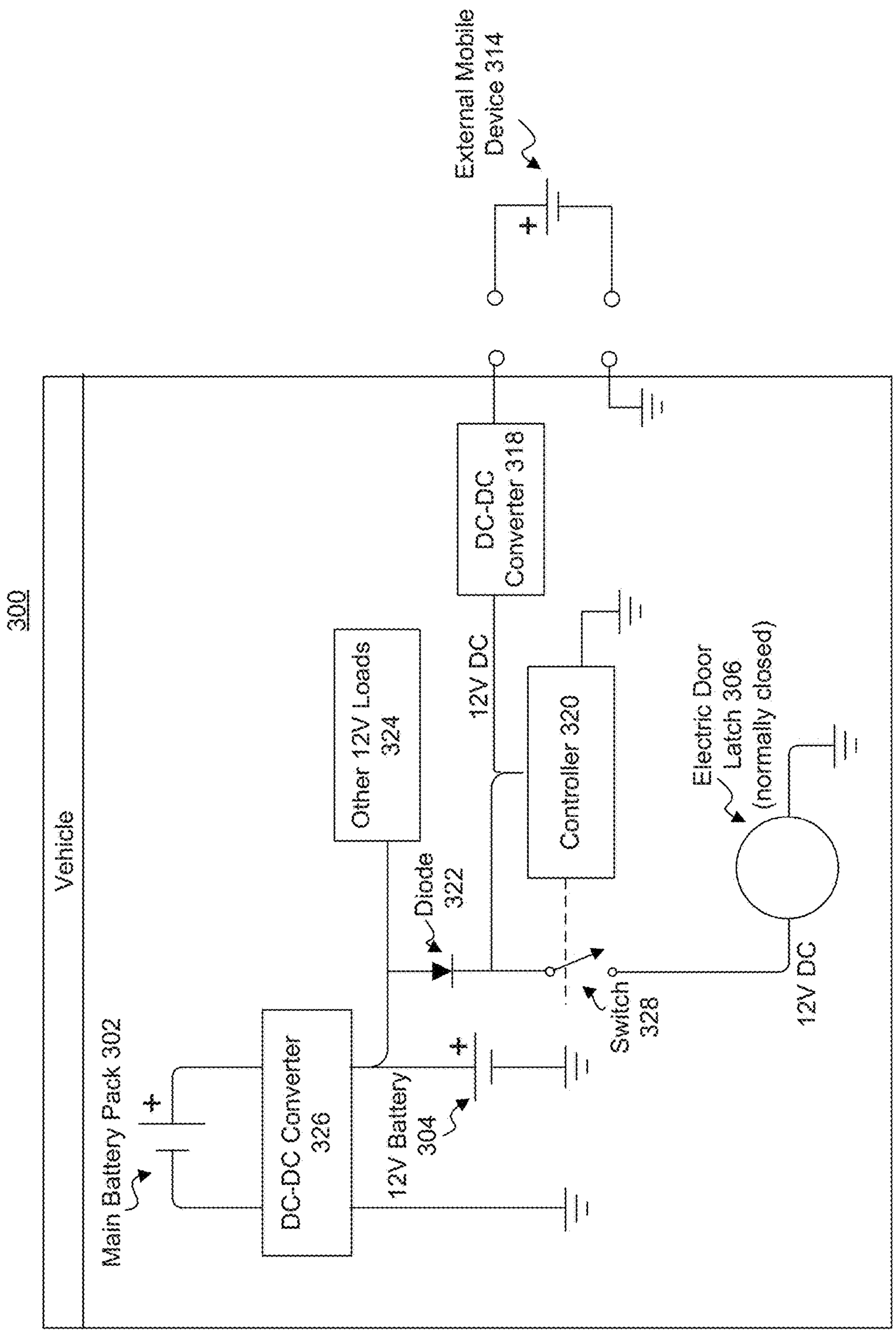
FIG. 3 is a schematic diagram illustrating an exemplary circuit used in the vehicle illustrated in FIG. 1.

FIG. 3 is a schematic diagram of an exemplary circuit 300 used in vehicle 100 illustrated in FIG. 1. Part of circuit 300 may be implemented in electric door release system 200 illustrated in FIG. 2. For example, except external mobile device 314, all the other components of the circuit 300 may be onboard vehicle 100 (FIG. 1). Referring to FIG. 3, circuit 300 may include a main battery pack 302 outputting high-voltage DC to drive the high-voltage power electronics onboard. Circuit 300 may also include a 12V battery 304 outputting 12V DC to drive electric door latch 306 and other 12V loads 324. A DC-DC converter 326 may be connected between main battery pack 302 and 12V battery 304, serving to convert the high-voltage DC from main battery pack 302 into a 12V DC voltage for charging 12V battery 304. In some embodiments, power output from DC-DC converter 326 may also be used for driving electric door latch 306 and other 12V loads 324.

When both main battery pack 302 and 12V battery 304 are completely drained, an external mobile device 314 may be connected to the onboard part of circuit 300 to drive electric door latch 306. A DC-DC converter 318 may be used to convert the DC voltage outputted by external mobile device 314 into 12V. A diode 322, serving as isolation circuitry, may be used to prevent the 12V DC outputted by DC-DC converter 318 from flowing to 12V battery 304 and other 12V loads 324. Thus, the 12V DC outputted by DC-DC converter 318 is only used to power controller 320 and electric door latch 306. Controller 320 may authenticate external mobile device 314. If the authentication is successful, controller 320 may activate electric door latch 306 by closing a switch 328 between electric door latch 306 and external mobile device 314. In exemplary embodiments, switch 328 may be implemented by an analog device such as a transistor, or an IC chip.

Though described with reference to vehicle components, and particularly with reference to vehicle doors, the present disclosure is not limited to use in a vehicle. For example, the disclosed systems may be applied to an office entrance door. Moreover, the present disclosure is not limited to use when both the main battery pack and the 12V battery are drained. For example, the disclosed systems may be used in situations where the 12V onboard system malfunctions or the 12V battery freezes at an extremely cold temperature. In these situations, the main battery pack and/or the 12V battery are not necessarily drained.

It will be apparent to those skilled in the art that various modifications and variations can be made to the disclosed electric door release system. Other embodiments will be apparent to those skilled in the art from consideration of the specification and practice of the present disclosure. It is intended that the specification and examples be considered as exemplary only, with a true scope being indicated by the following claims and their equivalents.

What is claimed is:

1. An electric door release system for releasing a vehicle door when a primary power source of the vehicle is drained, comprising:

a power interface configured to receive a direct-current (DC) power from an external mobile device;

a DC-DC converter configured to convert the DC power provided by the external mobile device into a second DC power;

one or more door latches;

an isolation circuitry configured to prevent the second DC power from powering circuitry not included in the electric door release system; and a controller configured to activate a door latch using the second DC power.

2. The system of claim 1, wherein the second DC power is at a different voltage level from the DC power provided by the external mobile device.

3. The system of claim 1, wherein the controller is further configured to:

authenticate the external mobile device; and if the external mobile device is not authenticated, refuse to activate the door latch.

4. The system of claim 3, further comprising: a switch between the door latch and the external mobile device, wherein the controller is configured to close the switch if the external mobile device is authenticated.

5. The system of claim 1, wherein the controller is further configured to:

receive a door release request input from the external mobile device; and activate the door latch using the second DC power upon receiving the door release request.

6. The system of claim 1, wherein the power interface further includes a control panel configured to receive a user selection of a door to be released, wherein the controller is configured to activate a door latch associated with the selected door with the second DC power.

7. The system of claim 1, wherein the isolation circuitry includes a diode that prevents the DC power from flowing into the circuit not included in the electric door release system.

8. The system of claim 1, wherein the power interface is connected to a charging connector configured to draw the DC power from the external mobile device.

9. An electric door release method for releasing a vehicle door when a primary power source of the vehicle is drained, comprising:

receiving, by a power interface, a DC power from an external mobile device;

converting, by a DC-DC converter, the DC power provided by the external mobile device into a second DC power;

receiving a selection of a door to be released;

directing the second DC power to a door latch associated with the selected door, wherein the second DC power is directed away, by an isolation circuitry, from powering electric loads other than releasing a door; and activating, by a controller, the door latch using the second DC power.

10. The method of claim 9, wherein the second DC power is at a different voltage level from the DC power provided by the external mobile device.

11. The method of claim 9, wherein activating the door latch further comprises:

authenticating, by a controller, the external mobile device; and if the external mobile device is not authenticated, refusing, by the controller, to activate the door latch.

12. The method of claim 11, wherein a switch is electronically connected between the door latch and the external mobile device, the method further comprising: closing, by the controller, the switch if the external mobile device is authenticated.

13. The method of claim 9, wherein activating the door latch further comprises:

receiving, by a controller, a door release request input from the external mobile device; and activating, by the controller, the door latch using the second DC power upon receiving the door release request.

14. The method of claim 9, wherein receiving the DC power from the external mobile device further comprises:

receiving a connection with the external mobile device via a charging connector; and drawing the DC power from the external mobile device.

15. A vehicle, comprising:

one or more door latches;

one or more primary power sources for powering the one or more door latches;

a power interface configured to receive a DC power from an external mobile device;

a DC-DC converter configured to convert the DC power provided by the external mobile device into a second DC power;

a controller configured to activate a door latch using the second DC power after the one or more primary power sources are drained; and an isolation circuitry configured to prevent the second DC power from charging the one or more primary power sources.

16. The vehicle of claim 15, further comprising:

a control panel configured to allow a user to input a door release request from outside of the vehicle, wherein the controller is further configured to activate the door latch using the second DC power upon receiving the door release request.

17. The vehicle of claim 15, wherein the controller is further configured to:

authenticate the external mobile device; and if the external mobile device is not authenticated, refuse to activate the door latch.

* * * * *